US011288274B1

(12) United States Patent
Alsaadi et al.

(10) Patent No.: US 11,288,274 B1
(45) Date of Patent: Mar. 29, 2022

(54) SYSTEM AND METHOD FOR STORING DATA FOR, AND PROVIDING, RAPID DATABASE JOIN FUNCTIONS AND AGGREGATION STATISTICS

(71) Applicant: Yellowbrick Data, Inc., Palo Alto, CA (US)

(72) Inventors: Adel Alsaadi, Fremont, CA (US); Jim Peterson, San Jose, CA (US); Paritosh Kulkarni, San Jose, CA (US)

(73) Assignee: Yellowbrick Data, Inc., Mountain View, CA (US)

( * ) Notice: Subject to any disclaimer, the term of this patent is extended or adjusted under 35 U.S.C. 154(b) by 0 days.

(21) Appl. No.: 16/888,621

(22) Filed: May 29, 2020

Related U.S. Application Data

(60) Provisional application No. 62/854,282, filed on May 29, 2019, provisional application No. 62/880,574, filed on Jul. 30, 2019.

(51) Int. Cl.
*G06F 16/24* (2019.01)
*G06F 16/2455* (2019.01)
*G06F 16/22* (2019.01)

(52) U.S. Cl.
CPC ........ *G06F 16/2456* (2019.01); *G06F 16/221* (2019.01)

(58) Field of Classification Search
CPC .................................................. G06F 16/2456
USPC ........................................................ 707/812
See application file for complete search history.

(56) References Cited

U.S. PATENT DOCUMENTS

2011/0167192 A1* 7/2011 Iyer ..................... G06F 12/0851
711/5
2013/0318067 A1* 11/2013 Sukhwani ........... G06F 16/2456
707/714

* cited by examiner

*Primary Examiner* — Syling Yen
(74) *Attorney, Agent, or Firm* — Innovation Partners LLC; Charles E. Gotlieb

(57) ABSTRACT

A system and method processes join requests via independently running engines. A build side table to be joined is allocated among high speed memories of the engines. Each row of a probe side are allocated to the engine likely to have build side data corresponding to the row, and the engine then performs the join. Aggregation statistics may be computed by distributing the information across the engines.

21 Claims, 6 Drawing Sheets

SYSTEM AND METHOD FOR STORING DATA FOR, AND PROVIDING, RAPID DATABASE JOIN FUNCTIONS AND AGGREGATION STATISTICS

RELATED APPLICATIONS

This application claims the benefit of U.S. provisional patent application Ser. No. 62/854,282 entitled, "Method and Apparatus for Storing Data for Performing, Rapid Database Join Functions" filed by Adel Alsaadi, Jim Peterson, and Paritosh Kulkarni on May 29, 2019, and U.S. provisional patent application Ser. No. 62/880,574 entitled, "Method and Apparatus for Storing Data for Performing, Rapid Database Join and Aggregation Statistics" filed by Adel Alsaadi, Jim Peterson, and Paritosh Kulkarni on Jul. 30, 2019, each such application having the same assignee as this application and each is incorporated by reference in their entirety.

FIELD OF THE INVENTION

The present invention is related to computer hardware and software for providing database join functions and aggregation statistics.

BACKGROUND OF THE INVENTION

Database "joins" join data from two tables: a probe side table and a build side table. The data from each of one or more rows of the probe side table is received and searched for in a multi-row build side table. If the data from the probe side table row is located in the build side table, certain columns from the build side table corresponding to the located row or rows having the matching data are returned as joined data.

Aggregation Statistics

Database systems perform join functions and supply aggregation statistics in databases in a suboptimal fashion. What is needed is a system and method for performing database join functions and supplying aggregation statistics.

SUMMARY OF INVENTION

A system and method stores build-side table data to allow database join functions to be performed rapidly, and then performs those functions against a probe side table. Data from two or more columns of the build side of the database table are stored across multiple memory banks, each of which may be accessed independently of the other memory banks. Engines, such as those that may be encoded into silicon circuitry such as Field Programmable Gate Arrays or Application Specific Integrated Circuits, perform the accessing, to allow the data to be accessed in a parallel manner, with each engine accessing one memory bank.

A join request may specify an identifier of a database, an identifier of the probe side table and an identifier of the build side table, the column identifier of a key column on the build side, and an identifier of a column containing data values in the probe side table to match to the key value or values, and identifiers of one or more other columns from the build side table (referred to as join columns) to be returned if a match between the data value of each row of the probe side table and any row of the build side key column is located.

When a join request is received, a determination is made as to whether the data needed to fulfill the request on the build side is already stored in the memory banks in the form required to fulfill it. If so, that data is designated as the build side and the other table to be joined is designated as the probe side. If not, the key column (the column in the build side table that is used to match values in the request) and the other specified columns from the build side table to be joined under the request are retrieved from a data source received with the request, and the retrieved data is stored in the memory banks. The determination of whether the data is stored in memory, and/or the storage of such data may be made by the entity sending the request or by the entity that receives the request, for example from a user or program performing a query that incorporates the join request. Data may be considered not to be stored in memory if it is outdated or overwritten in the memory banks.

In one embodiment, the build side table will be the table with the smallest number of rows, unless the other table is already stored in memory, in which case the already stored table is considered to be the build side.

To store a row of build side data, the key column from that row is hashed and some, but not all bits of the hash result are used to assign the row to one of several engines that each serve a different independently-addressable memory bank. A different portion of the hash is used to assign the key and other columns from the row, and optionally, the remainder of the hash not already used, into one of two types of data structures.

In a main (or primary) data structure, the key is stored at a location based on some, but not all, of the remaining bits from the hash, those not used to assign the row to the memory bank. For example, for a 16-bit hash result, 3 of the bits may be used to assign the data to an engine, and 10 of the remaining 13 bits may be used to select an address at which a linked list of key and join values having the same 10 bits of their hash results, may be stored. This means all of the hash itself may not be stored in the memory bank, as its value is implied by the address, or the remaining bits of the hash not used to select a memory bank or address may be stored, and, after all of the rows of the data source are stored, there may be nothing stored at some addresses, and some collisions, where more than one row of the data source should be stored at the same address.

If there is no different row of build side data already stored at the address specified by the subset of the bits of the hash result, as much of the row as can be stored in a main data structure at a corresponding offset from a starting point of the probe data using the space for data storage is stored, starting with the key column or key column and hash remainder, and then the join columns that are to be joined from that same row as the key. The main data structure has a fixed maximum size for storage of the data from a single row. If more space is needed to store the row, a pointer is also stored in the main data structure and the pointer points to an address in a secondary data structure where the remainder of the row is stored.

If the key and join columns (and optionally, the hash remainder) from a row of the build side table is already stored at the address specified by the subset of the bits of the hash result, a pointer from that address to a free location in a separate section of the main data structure is added to that address and the additional row is stored that address in the same manner as described above, with any portion that does not fit in the main data structure being added to the memory location in the secondary data structure pointed to by a pointer in the main data structure. The separate section of each block of the main data structure is used to store data from hash collisions with data already stored in the main data structure and is not used as the start of a linked list.

Thus, some of each block of the main data structure is reserved for the second and subsequent entries in a linked list of row data.

In one embodiment, the main data structure is one or more blocks of a fixed size, such as 32K. If the main data structure has insufficient space to store the entire set of data, additional blocks are used. The starting point in memory of each block, an identifier of the contents of the block (such as an identifier of the columns and identifier of the table and database from which the columns were retrieved, or a unique identifier that substitutes for such identifiers) and the starting hash result portion of its contents, are stored in a control data structure that stores metadata of each of, or all of, the memory banks. The process is repeated for each row in the build side table.

As the build side table is stored into memory, aggregation statistics are computed for some all or none of the join columns, and optionally additional columns only to be aggregated, referred to as aggregation columns, as specified by the request. Such statistics are computed for each such other column, for each unique value of the key column. Statistics include minimum, maximum, count, sum and average, and may include other conventional aggregation statistics. For example, if there are 5 rows in a table, but only two unique values of the key column (with three rows containing one unique value and two rows containing the other unique value, there will be two sets of aggregation statistics computed for each of: a) the join columns for which aggregation statistics are to be identified, and b) the aggregation columns. Each set of aggregation statistics is identified using only the rows having one unique value of the key. For example, the maximum of one of the other such columns is the maximum value of that column for all rows with the same key value. If no join is being performed, the key is used as described above to allocate each row to one engine, where the aggregation statistics are maintained and updated for that row. Aggregation statistics can be computed without a join function being performed, but if the join function is performed simultaneously, the same key column is used for the join function and the aggregation statistics, in one embodiment. The aggregation column data need not be stored, unlike any join columns. Columns identified in the request as both join and aggregation columns are both stored and also used to compute aggregation statistics for the row.

Statistics may be retrieved from all engines and consolidated, either at the silicon structure containing the engines or the processor that receives them, or may be retrieved for a single key value at a time.

When all of the rows from the build side table corresponding to the request are loaded into the memory banks, the one or more rows from the probe side table are processed. A data value and row identifier from each row in the probe side table to be joined are retrieved from processor memory, and the data value is hashed. The same bits from the hash result of the data value that were used from the hash result of the key column of the build side table to assign the rows of the build side table to engine/memory bank pairs are used to assign the request to the engine that will process that request. Requests may be queued at each engine by the receiver, optionally using a priority queue. Each engine then processes the requests assigned to it, as will now be described.

The request passed to the assigned engine by the receiver includes the row from the original table, the value to be joined, and, in one embodiment, some or all of the remaining bits from the hash result. The engine removes the next request from its queue, and identifies the address in its memory bank that contains the start of a linked list of zero or more elements from the build side that potentially matches the probe row data value corresponding to the hash result. In some embodiments, the address is identified before the request is provided to the engine, and the address is provided with the request passed to the engine. The address is the same address of the start of the linked list at which build side data would have been stored if the key column had resulted in the same hash.

The engine then compares some of the bits of the value from the request with the corresponding bits of the key column and optionally, the hash remainder of the build side stored in the memory bank at the address received with the hash from the request or identified from it. If there is a match with those bits, the remaining bits of the value and key column and optionally hash remainders are compared. If there is a match, the values from the additional columns, and the row identifier from the request, are returned to the receiver, optionally being retrieved in part from the secondary data structure using any pointer to such data in the main data structure. If there is no match in either attempt, the linked list of other rows that start from that memory bank location are followed and the process described above is repeated for each one, either until there is one match, or the end of the linked list is reached, in which case the row identifier from the request is returned with an indication that no match could be found. In one embodiment, a parameter may be received with the request to find all matches, in which case, after the first match is located, any additional matches are located by continuing to follow the linked list from the matching data, comparing each build side key column and optionally, hash remainder, from the linked list as described above until the end of the linked list is located, and all of the values from the additional columns of the all matching rows are returned with the row identifier of the request.

Aggregation statistics may be computed on the probe side by using the probe value as the key, and including aggregation column data, in which case the aggregation column data is not returned with the other values.

DETAILED DESCRIPTION OF A PREFERRED EMBODIMENT

Figure 1:
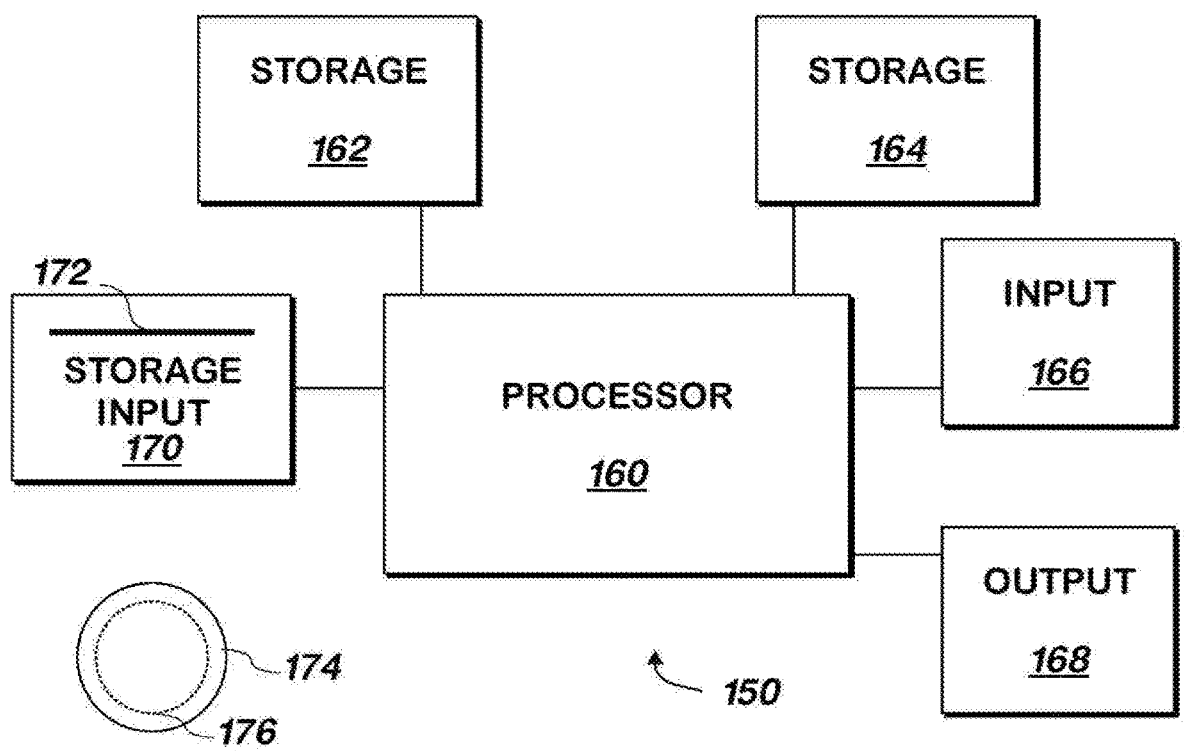
FIG. 1 is a block schematic diagram of a conventional computer system.

The present invention may be implemented as computer software running on a conventional computer system, computer software embodied on a non-transitory storage media, or otherwise. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile (i.e. non-transitory) storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system include any or all of at least one input, at least one output and at least one input/output. Other system elements may include a conventional processor.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional ORACLE SPARC T SERIES SERVER running the ORACLE SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as WINDOWS 10) commercially available from MICROSOFT Corporation of Redmond Wash. or a Macintosh computer system running the MACOS (such as Mojave) or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY S10 commercially available from SAMSUNG ELECTRONICS GLOBAL of Seoul, South Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2A:
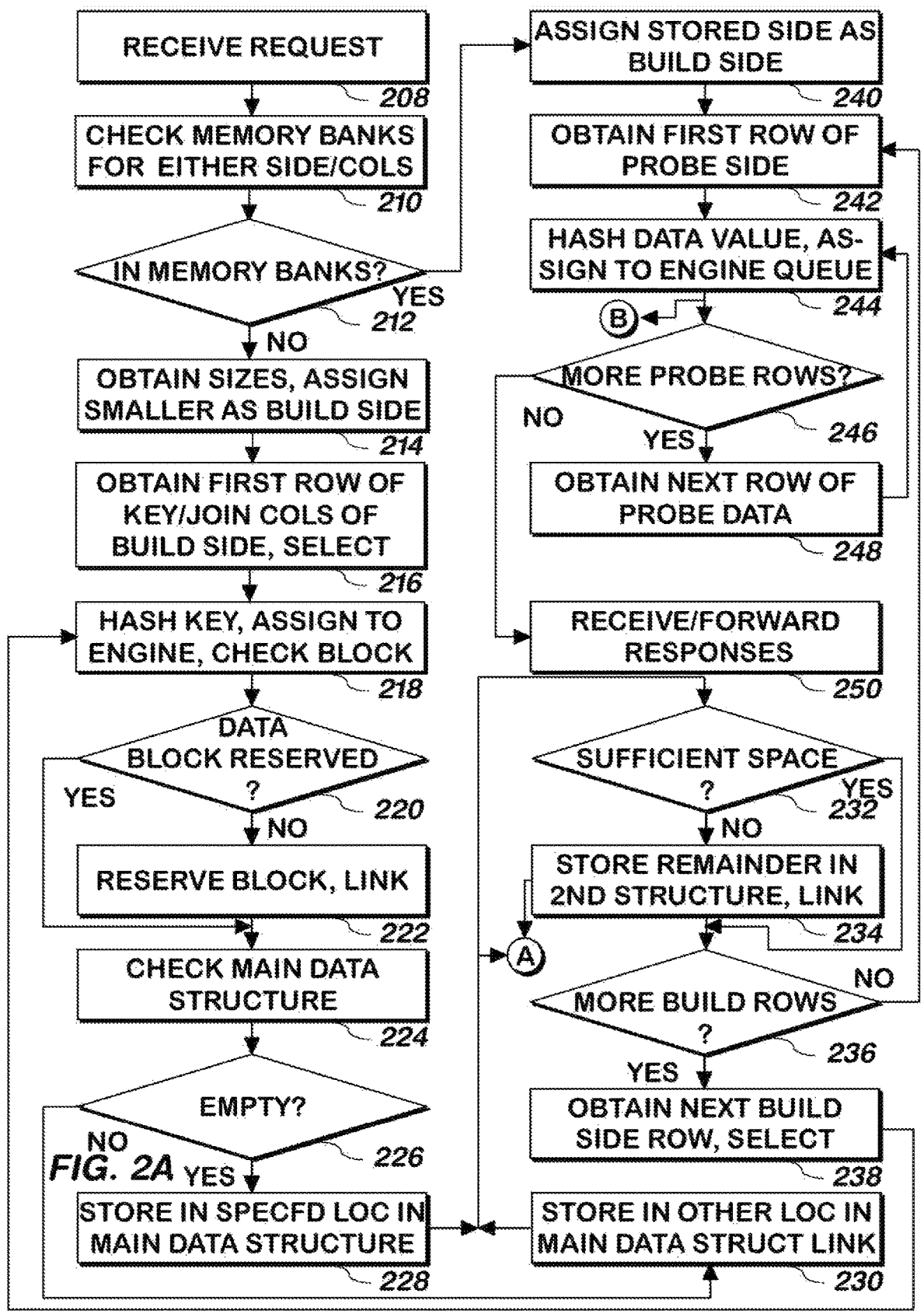
FIG. 2A is a flowchart illustrating a method of storing build side data into high speed memory at each of several engines and assigning rows from probe side data to one of the engines according to one embodiment of the present invention.
Figure 2B:
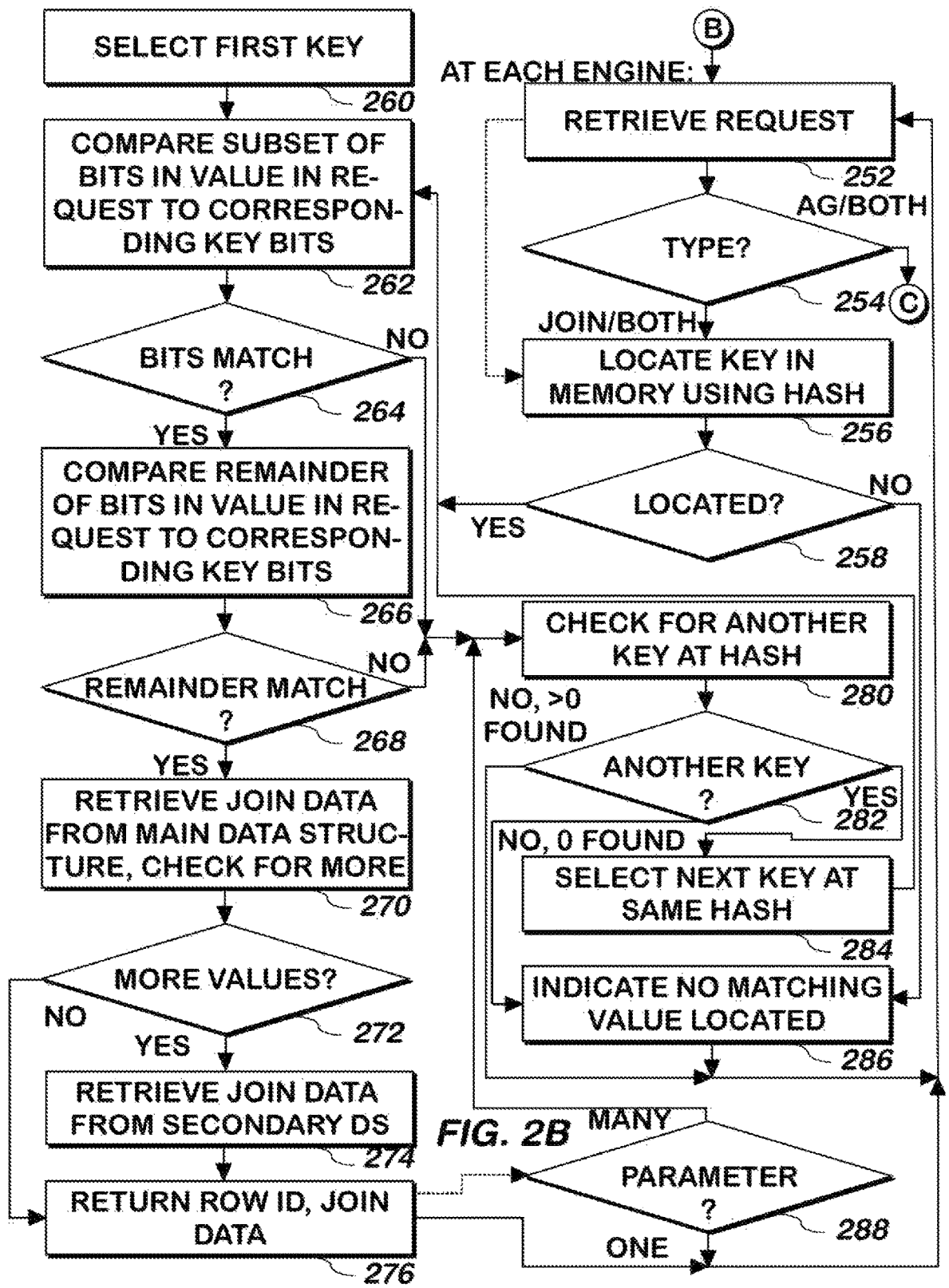
FIG. 2B is a flowchart illustrating a method of performing a join of a row from a probe side using stored data of FIG. 2A according to one embodiment of the present invention.

Referring now to FIG. 2, consisting of FIGS. 2A, 2B, a method of performing a join function is shown according to one embodiment of the present invention. A request to perform a join function is received 208. The request may be derived from a conventional database query, for example.

In one embodiment, a join request includes an explicit or implicit specification of a data source (such as a database or file name) as well as identifiers of two tables, to be designated as a "build side" and a "probe side" as described herein. In one embodiment, the request identifies a key column (referred to as the key) in the build side, which is the column that, if a row containing a value of the key matches the data value of a probe side row, the values from one or more other columns of the build side, referred to as "join columns" in that same row are to be returned. The join columns are also identified in the request, and may be any one or more columns from the build side table specified in the request. The column in the probe side that contains the data value is also specified in the request.

Each request may be produced as a result of receipt of a query from a process on a processor, which assigns build side information and probe side information corresponding to the request, to one of several memory banks or engines, which may consist of all or part of conventional silicon logic circuitry (FPGA, ASIC, etc.), or other similar custom circuitry like gate arrays, that perform the functions described herein.

Each engine has associated therewith its own memory bank. The memory bank of one engine is separately addressable from the other memory banks, and can be addressed by the engine, or a storage portion of the logic circuitry that stores data from the processor into the high speed memories and is common to all of the memory banks.

A determination is made as to whether the key and join columns from one side of the data source are already in the memory banks 210. In one embodiment, when a processor receives a query, the build and probe sides are not specified as such, and the processor has the flexibility to assign one table as the build side and another table as the probe side, and such assignment is made as described herein and below.

If the key and join columns from the table are already stored in the memory banks 212, the method continues at step 240 below. In one embodiment, the columns are stored in the memory banks if they have been previously stored, none of such data is overwritten, and the data has not been updated on the computer storage where it resides when it is not being joined, since it has been stored on the memory banks.

If the key and join columns are not stored in the memory banks 212, in one embodiment, the size of the tables from each side is obtained. In one embodiment, the size may be determined as a number of rows or it may be determined as the maximum number of bits used to store what will be the key and join columns from any one row of total number of bits from all rows, or any or all of these may be determined as part of step 214. In one embodiment, the smallest table in terms of number of rows is used as the build side, though in another embodiment, if the total number of bits of the other side is much larger than the total number of bits of the side with the smaller number of rows, or the maximum number of bits of the side with the smaller number of rows is much larger than the other side and the other side is below a threshold number of bits that can be stored in the main data structure described below, the table with the larger number of rows is assigned as the build side.

Transferring the Build Side from Processor Storage to High Speed Memories of the Engines.

The first row of the build side is selected, and the key and join columns from the selected row of the build side of the data source are obtained 216, for example from the memory or storage of a processor that is separate from any of the high speed memories of the engines. The processor may be used to process other functions of queries of databases that do not include join functions or do not include all join functions. As described herein, the rows are obtained from a table, though in other embodiments, the rows and their hashes may be obtained from a pre-built hash table, and the hashing described for their storage can be omitted, as it will already have been performed to build the hash table. In the latter case, some or all of the hash results are provided to the engines with the other data for the row described herein.

The key column value is hashed and a portion of the hash result of the value is used to assign such row data to one of several memory banks as part of step 218. For example, if there are 16 memory banks, any 4 bits such as the last 4 bits of the hash result may be used to assign the row to one of the engines, with those bits specifying a number from 0 to 15, and the engines having a unique identifier between 0 and 15, inclusive. Steps 220-230 are then performed for the engine and memory bank to which the row is assigned.

Some or all of the bits from the hash that were not used to assign the row to the engine are used to identify whether a data block has been created that is appropriate to hold the information from the row received. In one embodiment, the data blocks are 32K blocks of memory and having an allocated size for each row that is expected to hold the key values from the rows and each block is assigned its own range of hash results from a portion, but not all, of the hash bits that were not used to assign the row to an engine. In one embodiment, the bits from the hash result of the key column value for the row are used as an offset to store the key column value and the bits not used for this purpose nor to assign the row to the engine are stored with the key column value. It is noted that the blocks may not be contiguous, and thus the process may involve using the bits from the hash result to identify which block should be used, and then using the hash range of the blocks and the bits from the hash result to identify the position in the identified block, such metadata being maintained by the elements of FIG. 4 in processor metadata storage 402. For example, if the bits from the hash result used to determine the address of the start of the linked list are one greater than that the capacity of each block, the second block is identified and the first location of the second block is the address to be used to store the block. As described herein, the blocks are added as needed, though in other embodiments, the blocks for all possible hash result bits are added with the first block. If the blocks are added as needed, a control structure is updated with the first hash result for each block as the metadata for that block. Additional metadata may include indicating the first available position for rows that correspond to each possible hash result bits used to address the rows.

If the block needed has not been created 220, it is created 222, and the method continues at step 224. In one embodiment, creating the block includes reserving the block in memory and storing its address in processor metadata storage 402 or the block before it in the form of a linked list of blocks. The metadata for a request may contain a unique identifier of the data source, key column and join columns contained in each block, or another way of identifying the data contained in the blocks in the data structure, as well as the creation date and time of the first block and the last time any block was used. The contents of the blocks into which data will be stored may be set to zero or an empty bit may be set for each memory location to indicate that the locations are all empty.

The main data structure at the location indicated by the bits of the hash result is checked 224 to determine whether it is empty, either by checking for zero or an empty bit or by using the metadata stored with by the processor. The bits of the hash result used for this check exclude the bits used to assign the row data to the engine/memory bank pair, and may include less than all of the bits remaining after such exclusion.

If the space corresponding to the bits of the hash result is empty 226, the value from the key column and the join columns, as well as any bits from the hash result not used to assign the row to the engine or locate the address of the first element of the linked list in the main data structure, are stored in the main data structure at that location to the extent space is available to store them 228, and otherwise 226, an available space in the same data block, but at a different location in the block is identified and reserved, the amount of data from the row that would have been stored in the main data structure is stored at that available space, and a link is added from the last data row that was stored and had the same bits from the hash result 230. In this manner, the first such row is stored at the location corresponding to the bits from the hash result, and any other rows are stored as a linked list in a portion of the same data block that holds the data from the first such row, but is not used to store any first such rows. In one embodiment, the maximum amount of data that can be stored for any row in the main data structure is a fixed size.

Following steps 228 and 230, if there was not sufficient space to store the key column and the one or more loin columns and any remainder of the hash result in one row of the main data structure 232, the remainder of the row is stored 234 in a secondary data structure in the memory bank outside of the data blocks used to store the main data structure that is not organized by hash bits, and a pointer to the data in the secondary structure is added to the initial portion of the row data stored in the main data structure. In one embodiment, data is stored in the secondary structure sequentially as it arrives, and may be of any size. The method continues at step 236.

The main data structure and the secondary data structure are all part of the high speed memory bank for that engine, and each engine can use the main data structure or both, as needed. A link to the first block (and optionally all blocks) of the main data structure for each build side table may be maintained by the processor, which assigns the build side into the high speed memory, and a link to the secondary data structure is also maintained. All such metadata may be provided to the engines after the data from the build side is stored, for use in retrieving such data by the engines.

If there is sufficient space in the main data structure to store the key and join columns 232, the method continues at step 236.

At step 236, if there are more rows in the build side table, the next such row is selected, the row is obtained from processor memory 238, and the method continues at step 218 using the newly selected build side row of data.

It is noted that the steps of FIG. 2A are performed by a processor that is separate from the engines and has its own memory separate from the high speed memory. In one embodiment, storage of the row data into high speed memories as assigned by the processor is handled by one or more elements of the silicon logic circuitry that may be part of the same FPGA or Gate Array or other circuitry that also makes up the engines, as directed by the processor.

Once all of the rows from the build side have been transferred from processor memory to high speed memory as described above 236, the method continues at step 242.

Processing the Probe Side Data on the Processor.

At step 242, the first row of the probe side data is selected and the data value from the column specified in the request as the one to be joined is obtained. The probe side is the table on the other side of the join request that is not the build side. The data value is hashed and the same bits of the hash result used to assign build side data to the high speed memories is used for the hash of the probe side data value to assign the data value to an engine 244. The data value, portion of the hash result not used to assign the data value to the engine, and the row identifier are added to a queue for the assigned engine as a request to join the data value, and the method continues at step 246 and at step 252 of FIG. 2B.

At step 246, if there are more rows in the probe side table, the data value from the next row of the probe side table is obtained 246 and the method continues at step 244. Otherwise 246, the outputs of FIG. 23 from the probe side rows are forwarded to the process that made the request 250.

The build and probe side tables may be stored in processor storage, either memory or disk storage prior to processing as described herein.

Processing the Probe Side Data on the Engines.

Each engine then processes the requests it receives in its queue, simultaneously with the other engines, as will now be described.

The queue for the engine is checked and a request is retrieved from the queue 252 and a portion, but not all, of the hash bits that were not used to assign the data value to the engine are used to identify the start of the linked list corresponding to such hash bits 256. The start of the linked list may be identified using metadata about the range of each data block that is stored by the processor in the high speed memory or in a memory otherwise accessible to the engine. If no data block is located, or the start of a linked list (which may have one, or more than one, element) is not at the location 258, no matching value is indicated along with the row identifier with the request.

If the start of the linked list is located, 258, the first key in the linked list at the location in the data block corresponding to such hash bits is selected 260. In the embodiment in which the hash remainder (excluding the bits used to assign the engine and the address of the head of the linked list in which the data element is stored, referred to as a "hash remainder") is stored, the key and its hash remainder are selected. A subset of the bits in the selected key (or key and hash remainder) are compared with the corresponding bits from the value (or value and corresponding bits from the hash) in the request 262. If the subset of the bits do not match 264, the method continues at step 280. In one embodiment, the subset is only the hash remainder.

If the subset of the bits do match 264, the remaining bits in the selected key (or key and hash remainder) are compared with the remaining bits in the value (or value and corresponding bits of the hash) from the request 266, and if the remaining bits do not match 268, the method continues at step 280. If the remainder do match 268, the row identifier received with the request and any join column data stored with the matching key in the main data structure is retrieved (of which there may be some or none if there is insufficient storage space for the join column data in the main data structure) and a check is made to determine if there are any key and/or join values for the key that are stored in the secondary data structure 270. The check may be accomplished by detecting a pointer, that is not a null pointer, to additional bits in the key and join columns in the secondary data structure, and then the additional bits can be obtained by following the pointer. If there are no such bits in the secondary data structure 272, the method continues at step 276.

If there are additional bits for the key that are stored in the secondary data structure 272 they are retrieved from the secondary data structure 274 and the method continues at step 276.

At step 276, the join values and the row identifier received with the request are returned to the originator of the request, for example by passing them back to the receiver of the original join request made by the processor and the receiver forwards them to the original requestor. In one embodiment, the method continues at step 252.

In another embodiment, a parameter may be received that indicates whether all matches are to be found. If the parameter is not received or indicates that only the first match is to be returned 288, the method continues at step 252 and otherwise, the method continues at step 280 until there are no more keys in the linked list. In one embodiment, all of the join values are collected and returned with a single row identifier, or an error is indicated if no matches are found when the end of the linked list is located.

At step 280, the presence of another key at the location indicated by the hash bits is identified, for example, by determining whether a non-null pointer to any additional value in the main data structure exists from the last selected key in the linked list of keys and join values. If another key exists 282, the next key for the hash bits is selected, for example, by following the pointer in the main data structure 284, and the method continues at step 262 using the newly selected key, and otherwise 282, if no matching keys were found, an indication that the value received in the request could not be located is returned to the originator of the request with the row identifier received as part of the original request to perform the join, for example, by returning the indication and row identifier to the receiver of the original join request, which forwards them to the originator of the request 286. The method continues at step 252. In one embodiment, step 286 follows the no branch of step 282 only if no matching keys were located for the request. If at least one matching key was found in the linked list of 0 or more keys, the no branch of step 282 is followed by step 252.

System.

Each system element may include a conventional hardware processor or hardware processor system or processor system or processor that is coupled to a hardware memory or hardware memory system or memory or memory system, each of these being conventional in nature. The processor is specially programmed to operate as described herein. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa.

System elements are coupled to one another to perform the functions described herein and may utilize data obtained in any possible manner.

Figure 3:
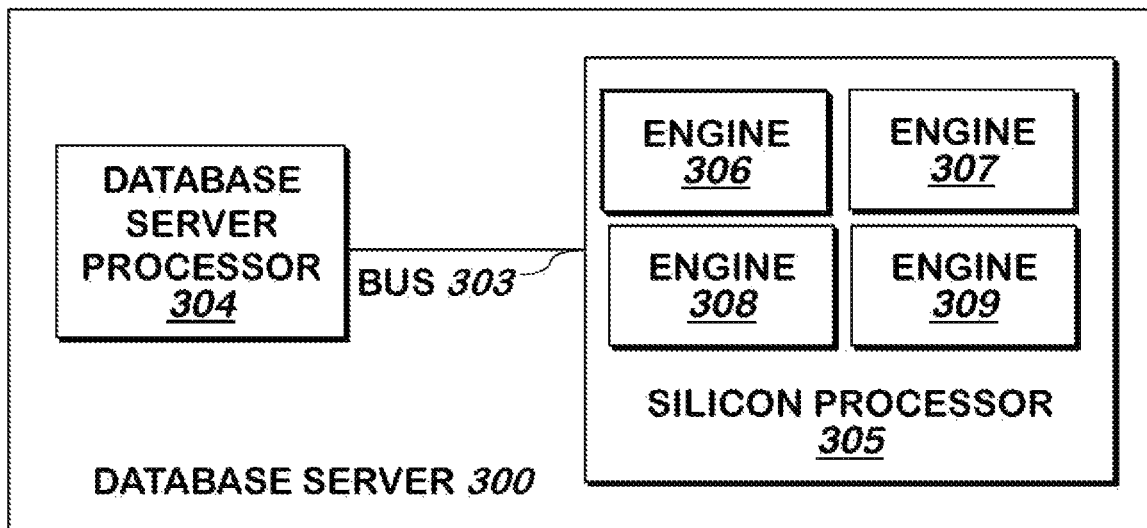
FIG. 3 is a block schematic diagram of a database server including a database processor and silicon processor according to one embodiment of the present invention.

FIG. 3 illustrates a block schematic diagram of a system for processing join requests according to one embodiment of the present invention.

Database server 300 is a conventional database server with the elements described herein added to it. Database server processor 304 is a conventional processor subsystem including a processor, memory and bus interface that also includes the elements of FIG. 4. Silicon processor 305 includes conventional customized silicon logic circuitry, such as an ASIC, gate array or other customized silicon logic circuitry and/or processor circuitry that includes a bus interface that allows it to communicate with database server processor 304 via bus 303, which may be a conventional processor interface bus. Silicon processor is shown in more detail in FIG. 5. Engines 306-309 operate in parallel and contain their own high speed memories, separately addressable from one another. 4 engines 306-309 are shown, but there may be any number of engines.

Figure 4:
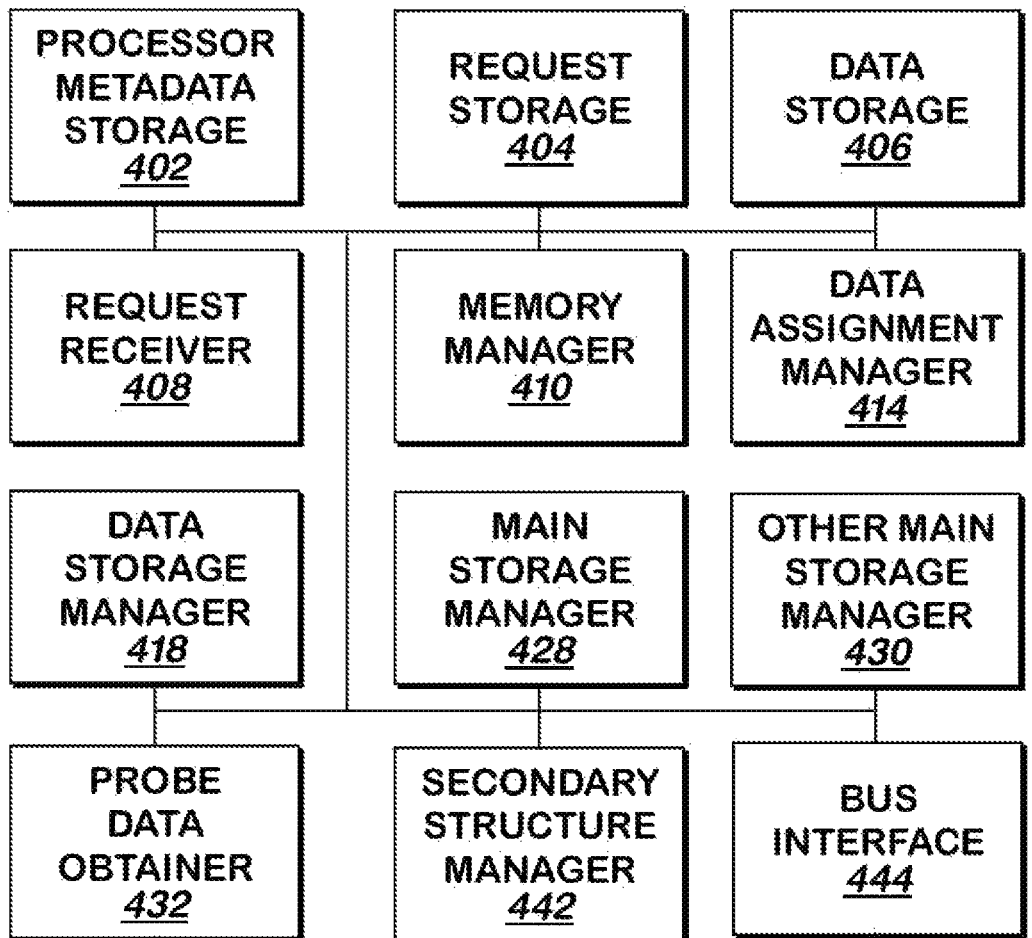
FIG. 4 is a block schematic diagram illustrating certain elements of a database processor of FIG. 3 in more detail according to one embodiment of the present invention.

Referring now to FIGS. 3 and 4, certain elements of database server processor 304 are shown in more detail according to one embodiment of the present invention. request receiver 408 receives a request to perform a join, which may be part of a conventional query. In one embodiment, the request identifies the data sources in data storage 406 to be used for the request, and the columns from the data source of each side, as described above. The request may include certain criteria that must be met on one or both sides of the request. As described herein, a "side" is a build side or a probe side, each comprising a table, with the build side selected as described above and the probe side being the other table being joined. In one embodiment, a data source includes one or more tables from a single database. Request receiver 408 provides the request to memory manager 410.

Memory manager 410 receives the request and determines if it can be fulfilled from data in the high speed memories of the engines 306-309 as described herein. In one embodiment, the elements of FIG. 4 maintain in processor metadata storage 402 the data source, rows and tables, any criteria and the locations of the data stored in the high speed memories, the date and time the data was initially stored, and the last date and time such data is accessed. (If there is insufficient room in the high speed memories to store any new data as described herein, the least recently accessed data stored in the high speed memory is overwritten.) If one side or the other is already stored with an exact match on the criteria, if any, and the same key column and at least the specified join columns, provided the table has not been updated since it was stored in the high speed memories as indicated by a last update date and time of the table in data storage 406 and the date and time the data was initially stored in the high speed memories (with a requirement that it be after the last update time of the table), memory manager 410 assigns that side as the build side and the other side as the probe side, and provides the locations of the data and the information from the request, including that corresponding to the probe side (that was not identified as being stored in high speed memory of the engines) to probe data obtainer 432.

In one embodiment, the criteria is not part of the request received by request receiver, as it only receives two table identifiers, with any criteria, having already been used to build such tables. The tables may be interim tables that are built by the provider in response to a query. However, in one embodiment, the provider of the table identifiers will reuse a table identifier if the criteria are the same as was used previously and the table wasn't updated since the table was stored in high speed memories of engines 306-309, to allow that side to be used as the probe. The tables may be interim tables that are built by the provider in response to a query.

If neither side is stored in high speed memory of the engines, memory manager 410 provides the request to data assignment manager 414. In one embodiment, the request identifies the number of rows in each side to be joined (or data assignment manager 414 obtains it from metadata about the tables of each side stored in data storage 406) and the table identifiers of each side, and identifies the relevant columns described above. When it receives the request, data assignment manager 414 identifies the table with the smallest number of rows, and this side is designated by data assignment manager 414 as the build side. Data assignment manager 414 obtains from data storage 406 the key and join columns of the first row of the build side table as specified in the request, hashes the key column from that row and assigns the row to the high speed memory of an engine using the hash result as described above. Data assignment manager 414 provides the identifier of the build side table, the hash result, the data from the key and join columns, and the key and join data and column identifiers, and the identifier of the assigned engine to data storage manager 418.

When it receives such information, data storage manager 418 retrieves the key and join columns from the first row of storage 406 which may include conventional memory or disk storage, identifies whether there is sufficient storage space for the key and join columns in the data structure block in high speed memory corresponding to the hash result, and if not reserves and initializes a block in the assigned engine 306-309 and links it to any other blocks for the table, and checks the main data structure to determine if it is empty at the location corresponding to the hash result. If the block reserved is the first block reserved for the request, data storage manager 418 also reserves the secondary data structure in the high speed memory of the assigned engine 306-309. In one embodiment, the main data structure resides in one or more blocks and the secondary data structure resides in its own reserved portion of high speed memory of the assigned engine 306-309 that may be of a significantly larger size than that of a block, and there may be only one secondary data structure for the table that may utilize multiple blocks (i.e. there need not be a one to one relationship: the relationship may be many to one). Reserving a block or secondary data structure may include storing into a portion of processor metadata storage 402 for the engine to which the reservation corresponds, an identifier of the storage area of high speed memory 506 of FIG. 5 being reserved and identifying the contents of the block or secondary data structure (e.g. the data source, key and join columns, and the creation date and time). Such data is also maintained in processor metadata storage 402

The reserving of the block may identify the starting hash location for that block and its location in the high speed memory in processor metadata storage 402. Data storage manager 418 provides the address of the main data structure corresponding to the hash, the first available other location address in the main data structure, the address of the second data structure, the hash result and the key and join column contents, and the identifier of the assigned engine to main storage to main storage manager 428, which receives them. Data storage manager 418 may maintain the storage information about the blocks, dates and times, and their contents (i.e. which storage areas are used, etc.), as described herein, in processor metadata storage 402, which contains information about the data stored in high speed memory 506 of each engine. The engine to which the data is assigned is the one for which the metadata is updated.

Figure 5:
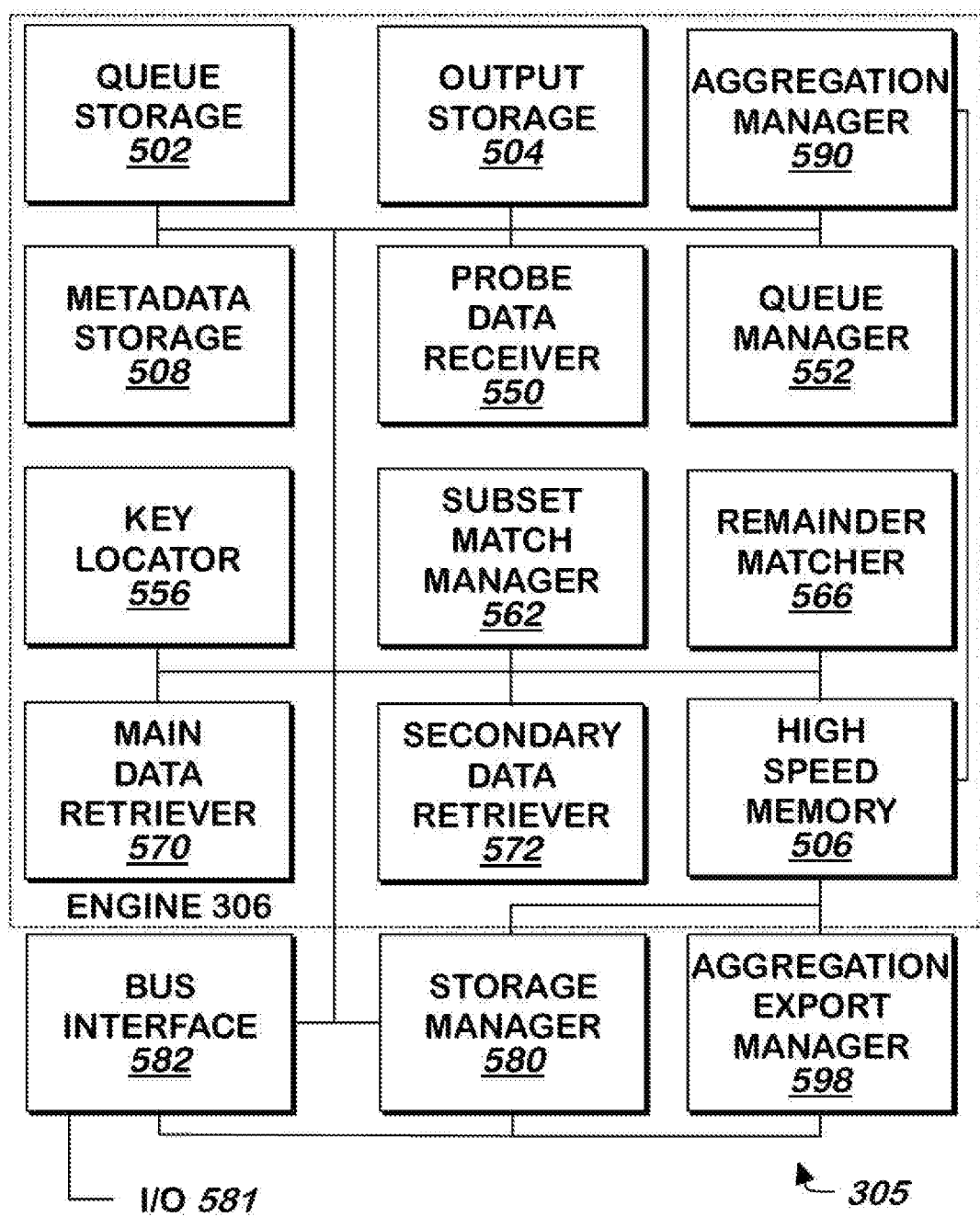
FIG. 5 is a block schematic diagram illustrating a silicon processor of FIG. 3 in more detail according to one embodiment of the present invention.

Main storage manager 428 checks the metadata for the main data structure of the assigned engine 306-309 in processor metadata storage 402 to determine if the main data structure at the address corresponding to the portion of the hash result is empty and if so, stores, via storage manager 580 of FIG. 5, as much of the hash result remainder (the portion of the hash result not used as part of the address and not used to select the engine), key and join columns into the main data structure as possible at the address corresponding to the hash result, adds a null pointer to indicate the information so stored is the end of a linked list, and updates processor metadata storage 402 to indicate that the address is not empty.

If it is not empty when checked, main storage manager 428 provides the information it receives to other main storage manager 430. In one embodiment, data storage manager 418 provides the information to other main storage manager 430 instead of main storage manager 428 if the location in the main data structure corresponding to the hash result is not empty as indicated by processor metadata storage 402.

The hash result remainder is the bits from the hash result that do not directly correspond to the memory location for the hash result that corresponds to the first linked list element in the main data structure, nor identifies the engine. For example, if ignoring the leftmost six bits of the hash result maps to the start of the linked list of high speed memory 506, and the rightmost three bits of the leftmost six bits are used to assign data to an engine, the hash result remainder is the leftmost three bits, those that cannot be ascertained by identifying the address at the first linked list element or the engine. In other embodiments, some or all of the omitted bits are not omitted, and those not omitted are considered to be the hash result remainder, even if no bits are omitted.

Other main storage manager 430 follows any linked list until the end as described above and then stores as much of the hash result remainder, key and join columns as possible into the first available (as indicated by metadata storage 402) other location in the block in high speed memory of the assigned engine 306-309, and links the former end of the linked list to it and updates the metadata in processor metadata storage 402 to indicate the space used.

If there is additional data from the key and join columns not stored as described above, main storage manager 428 or other main storage manager 430 obtain from processor metadata storage 402 the next available location in the secondary data structure, store a pointer to that location with the data stored into the main data structure, provide the remainder of the key and join columns (and optionally the hash result remainder) not stored and the identifier of the assigned engine 306-309 to secondary structure manager 442 along with the location in the secondary structure they obtain and the identifier of the assigned engine and secondary structure manager 442 stores such remainder at that location into high speed memory of the assigned engine 306-309. Main storage manager 428 or other main storage manager 430 update in processor metadata storage 402 the next available location in the secondary data structure as it will exist after such storage. Storage of all such information from the build side into the high speed memories may be accomplished via storage manager 580, which has access to all of the high speed memories of all engines, and which receives the engine identifier with the address and the data to be stored, to allow the data to be stored in the proper engine 306-309.

Data assignment manager 414 obtains the contents of the next row in the build side table and repeats the process described above until all rows of the build side table are stored in the high speed memory of the engines. When the storage of the build side table is complete, data assignment manager 414 stores via storage manager 580 of FIG. 5 the metadata regarding the contents of the high speed memory of each engine 306-309 in processor metadata storage 402 into metadata storage 508 for that engine and provides the locations of the data in processor metadata storage 402 and the information from the request, including that corresponding to the probe side, to probe data obtainer 432.

FIG. 5 illustrates silicon processor 305 of FIG. 3 in more detail. Only one engine 306 is shown in the Figure, though silicon processor 305 can include any number (such as 8 or 16) of engines that have the same components as the engine 306 shown, each operating simultaneously. Typically, the number of engines will be a power of 2.

Referring now to FIGS. 3, 4 and 5, when it receives such information, probe data obtainer 432 retrieves from data storage 406 and provides the probe data (data value and row identifier) to probe data receiver 550, which receives the probe data as described above, and hashes the data value of the received probe row. Probe data receiver 550 provides the data value, hash (optionally excluding bits from the hash that in the case of build key column hashes, are used to assign the hash results to engines) and row identifier of the selected row as a join request to queue storage 502 of the engine that corresponds to the same few of the hash bits that were used to assign build data to engines 306-309. The row identifier is the identifier of the row that was provided by probe data obtainer 432. Probe data receiver 550 then receives the next row of the probe data and repeats the process until all rows of the probe data have been distributed to the queues of the various engines based on the hash value of the data value of the row. In one embodiment, probe data obtainer 432 receives an identifier of the requestor that is passed along from request receiver 408, assigns a unique request identifier to all of the rows of the probe data from a single join request, adds the request identifier with the other data that is added to the queues of the various engines, and stores the identifier of the requestor, and unique request identifier into request storage 404 to allow it to return the join data as described herein. The following actions are performed by each of the engines simultaneously.

Queue manager 552, checks the queue in queue storage 502 and if it locates a join request, it provides the information from the join request to key locator 556. Key locator 556 uses the portion of the hash result as described above and the metadata for the stored data structures in metadata storage 508 to either locate the address of the main data structure corresponding to the portion of the hash result, or determine that there is no such address. If there is no such address, key locator 556 so indicates by returning to queue manager 552 an error indication with the row identifier that was sent as part of the probe data and the unique request identifier. Queue manager 552 returns the request and row identifiers and an error indication to probe data obtainer 432, which forwards it to the process that provided the request to request receiver 408, as indicated by the information in request storage 404. Queue manager 552 selects the next queued row data and repeats the process.

Although, as described herein, the output is returned to the requesting process as it is obtained, in another embodiment, it may be stored into output storage 504 and returned in a batch from each engine when the last request queued at the engine that corresponds to a request received by request receiver 408 is received. The batches from each engine may be optionally stored by probe data obtainer 432 in request storage 404 and returned in a single batch for all engines.

If it locates the location, key locator 556 uses the first key column data value at the location, addresses the location on an address bus for high speed memory 506 and signals subset match manager 562 with the data value from the probe data. High speed memory 506 may be integral to engine 306 or separate from it. Subset match manager 562 then performs the subset match of the addressed key column data value or key column data value and subset of the hash result if the hash result remainder is stored. In one embodiment, the subset of the hash result matched is the remainder of the hash result that does not correspond to the address of the first key in the optional linked list (which at this point, is the key under investigation), nor the portion of the hash result that corresponds to the engine.

If there is no match of the subset, subset match manager 562 signals key locator 556 with a flag indicating no match was found, and key locator 556 identifies if there is a pointer from the data containing the selected key column data value. If not, key locator 556 provides the row and request identifiers and an indication of an error to queue manager 552, which forwards such data to probe data obtainer 432, which forwards it as described above. If a pointer is located, key locator 556 addresses the next key column data value in high speed memory 506 using the pointer and repeats the process described above using the location of the newly selected key column data value.

If the subset matches, if there is additional hash result and/or key column data to be matched, subset match manager 562 enables remainder matcher 566 and, if necessary, makes available the remainder of the data value and optionally, the remainder of the hash key not represented by the address of the first key. Making available may include addressing high speed memory 506. When enabled, remainder manager 566 determines if there is a match of the additional data to be matched as described above. If there is no match, remainder manager 566 signals key locator 556, which operates in the same manner if it is signaled by subset match manager 562. If there is a match, key locator 556 addresses high speed memory 506 corresponding to the join column or columns and enables main data retriever 570 to retrieve the join column or columns data corresponding to the additional data that matched, and main data retriever 570 obtains the data and provides it to queue manager 552, and indicates to queue manager 552 whether there is join data or additional join data stored in the secondary data structure, as indicated by a non-null pointer to it. Queue manager 552 adds the data into output storage 504 in an area corresponding to the request identifier, along with the row identifier and request identifier that had been queued, in the area reserved for the responses for the same request identifier as the other rows for the same request.

The addressing of high speed memory 506 as described herein may include providing an initial address, with the element that is retrieving data incrementing the address as needed to retrieve all of the data. In one embodiment, the metadata stored in metadata storage 508 includes the sizes of each of the data elements provided by the storage managers 428 and 430, or there may be delimiters that identify the ends of each data element, and the data is retrieved to the proper delimiter, or both requests are used.

If there is join data stored in the secondary data structure as evidenced by a non-null pointer to the additional data in the main data structure, main data retriever 570 retrieves the pointer to it, addresses high speed memory 506 to make available data from the secondary data structure, and enables secondary data retriever 572. Secondary data retriever 572 retrieves the data from the secondary data structure and provides it to queue manager 552 which adds it to the data in output storage 504 as described above, and signals key locator 556. If there is no data in the secondary data structure, main data retriever 570 signals key locator 556.

If the parameter for the data value indicates that multiple matches are allowed, when signaled, key locator 556 checks to see if there is a link from the key and join column data processed as described above to another set of key and join column data for the portion of the key. If so, key locator 556 retrieves the pointer, addresses high speed memory 506 using the pointer, and repeats the process described above. If there is no pointer or a null pointer, key locator 556 signals queue manager 552. If the parameter does not indicate multiple matches are allowed, key locator 556 signals queue manager 552. The parameter may be provided with the data value into the queue as indicated by the original join request received by request receiver 408, which passes it to probe data obtainer 432 via memory manager 410.

When signaled by key locator 556, queue manager 552 returns the join data from output storage 504 and the row identifier received with the request and the request identifier to probe data obtainer 432, which forwards it to the process that provided the request to request receiver 408 as described above. If no join data is stored in output storage 504, queue manager 552 provides the row identifier and request identifier from the request that did not return any join data to probe data obtainer 432 with an indication that no matching key data was located, and probe data obtainer 432 forwards it to the process that provided the request to request receiver 408. The join data and row identifier may be provided as described herein with the request identifier to allow the join data to be forwarded to the proper requestor.

Communication between database server processor 304 and silicon processor 305 is made input/output 445 of bus interface 444 and input/output 581 of bus interface 582, each of which may include conventional bus interfaces.

Each system element of FIG. 4 may include a conventional hardware processor or hardware processor system or processor system or processor that is coupled to a hardware memory or hardware memory system or memory or memory system, each of these being conventional in nature. The processor is specially programmed to operate as described herein. The system elements of FIG. 5 include logic circuitry or processors or equivalent. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa. System elements are coupled to one another to perform the functions described herein and may utilize data obtained in any possible manner.

Aggregation Statistics.

In one embodiment, aggregation statistics are maintained for some or all of the any of the build side columns described above, as well as additional columns, referred to as aggregation columns, which are columns need not be used for joining from a build side table, but for which it is desirable to maintain aggregation statistics. In one embodiment, the request specifies any join columns of the build side for which aggregation statistics are also to be maintained (in which case, the columns are both join columns and aggregation columns), as well as any aggregation columns that are not join columns. In another embodiment, aggregation statistics are always maintained for any build side columns, plus any columns specified in the request as being aggregation columns. Additionally, the request may specify only a build side and may specify that none of the build side columns are to be used for a join, and that they are only to be used to identify aggregation statistics. Thus, as used herein, a table that is only to be aggregated and will not be used for a join, is also known as a build side table, even if it is not used for any join functions.

While the engines are identifying the storage location, and storing the build side columns, if any, a different portion of each engine is aggregating any join columns also marked for aggregation and any aggregation columns, as will now be described. In one embodiment, the build side may be specified based on the request, instead of selecting it as described above. In one embodiment, the build side would be the side for which aggregation columns are specified.

Referring again to FIG. 2A, at step 214, the side with any aggregation statistics required may be used as the build side, and any aggregation columns are additionally retrieved at step 216.

It is noted that the aggregation columns may be processed as part of the probe side in other embodiments, in which case the aggregation columns are provided with the probe data and aggregation statistics are computed by the receiving engine in the same manner as is described herein.

It is also noted that the key column for the join function and aggregation statistics may be different, in which case the request is processed solely as an join using one key column and then processed solely as an aggregation using a different key column.

Referring again to FIG. 2B, instead of step 256 following step 252, step 254 follows step 252, which includes checking the types of the columns specified in the request. If the request specifies join columns, which may include the specification of both joins and aggregation columns 254, the method continues at step 256 as described above. If the request specifies aggregation columns 254, which may include the specification of both join and aggregation columns, the method continues at step 290 of FIG. 2C. Thus, if the request specifies both types of columns, both branches from step 254 are taken, with the same value used as the key for performing the join function described herein and for aggregation statistics. It is noted that a single column may be specified as a join column, an aggregation column, or both. The columns specified in the request are from a single database table in one embodiment.

Figure 2C:
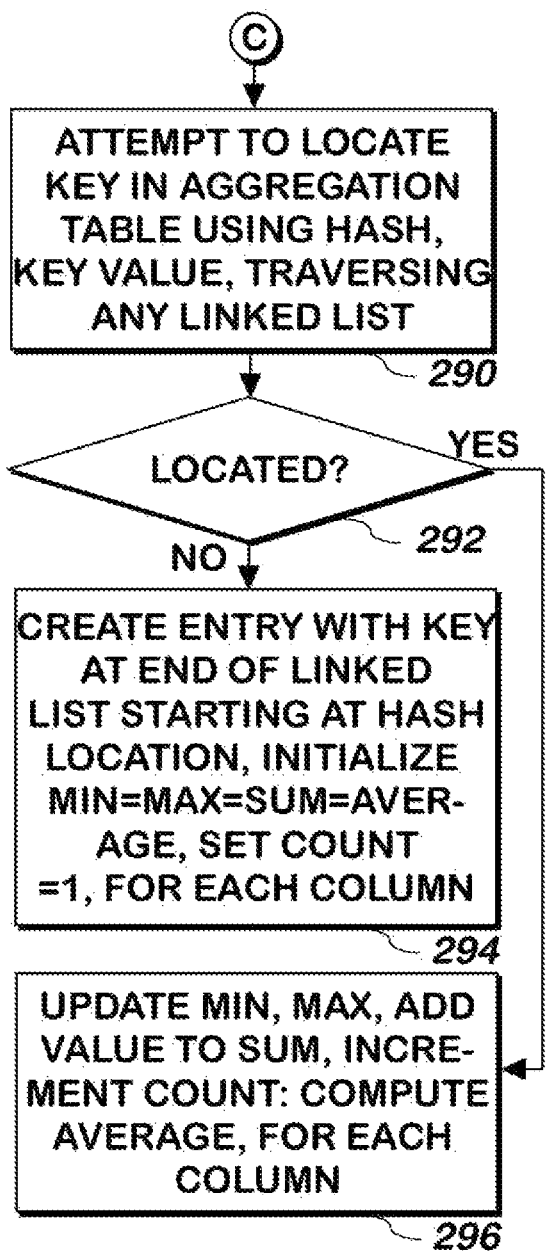
FIG. 2C is a flowchart illustrating computation and storage of aggregation statistics according to one embodiment of the present invention.
Figure 2D:
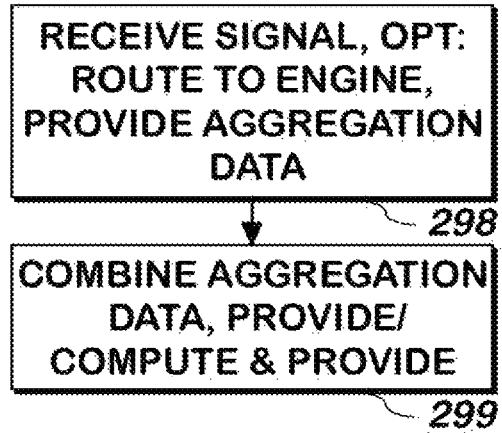
FIG. 2D is a flowchart illustrating retrieval and provision of aggregation statistics according to one embodiment of the present invention.

At step 290 of FIG. 2C, an attempt is made to locate the key value of the build side in an aggregation table. In one embodiment, the aggregation table is organized using the same or similar linked list structure as described above, with the first key corresponding to a portion of the hash result not used to assign the key to an engine, being used to locate the head of a linked list of keys having zero or more elements in the list. Specifically, the portion of the hash bits of the hash of the key column of the row data that was not used to assign the row data to an engine as described above with respect to FIG. 2A is used to locate the key column in an aggregation table that is stored in high speed memory. The hash bits are used as, or to compute, an offset to the start of the table. In one embodiment, more of the hash bits are used than are used to store the join columns as described above, though the same, or a smaller, number of the hash bits may be used in other embodiments.

In one embodiment, to locate the key value in the aggregation table, the portion of the hash bits are used to locate a key value at the offset from the start of the table corresponding to the portion of the hash bits, and the value at that location is compared to the key value received for the row. If the key values are the same, the key value is considered to be located. A two stage comparison may be used for locating key values for computing or providing aggregation statistics as was described above for performing join functions. If the key values are not the same, a determination is made as to whether there are additional key values corresponding to that location by checking to see if there is a pointer to an additional key value at that location. If so, the pointer is followed to a different area of the aggregation table and the process is repeated until the key values match or a null pointer is found. If no key value or no pointer or a null pointer is found at the location corresponding to the portion of the hash bits, or a null pointer is located before a match of the key values is made, the key value is considered not to have been located, and otherwise it is.

If the key value is not located 292, an entry is created at an offset from the start of the table corresponding to the portion of the hash bits, or if there is already a key value at that location, the linked list from that key value is followed until a null pointer is located and an entry is added 294 to the end of the linked list that starts at the location corresponding to the portion of the hash bits.

The entry added contains the key value, and, for each aggregation column (which may or may not also be marked as a join column), a minimum, maximum and sum that are all set equal to the value of such aggregation column, as well as a count equal to 1. In one embodiment, an average is initialized to the value of such join or aggregation column. The entries may be added to a separate main aggregation data structure in high speed memory that is separate from the main and secondary data structures, or it may be added to the main data structure or secondary data structure used to hold the join columns. A pointer from the first key value in the main data structure may be used to reference the aggregation statistics. In another embodiment, these statistics for each column are added to the end of the entry that contains the join columns as described above, either in the main data structure or the secondary data structure, or a pointer is provided from the main data structure to the other section of the main data structure to hold these statistics, and a separate aggregation table is not stored with a duplicate of the key.

If the key value is located 292, the minimum and maximum for each column, sum and average are updated using the value for each column, and the count for each column is updated by incrementing the count for each column and storing the result 296. The sum for a column is updated by adding the value for the column received to the stored sum and storing the result. The average for a column is updated by dividing the updated sum by the updated count and storing the result. The minimum for a column is updated by comparing the received value of the column to the minimum for that column and storing the received value if it is less than the minimum. The maximum is updated by comparing the received value of the column to the maximum for that column and storing the received value if it is greater than the maximum. Each time aggregation columns are received, they are processed in the above manner.

A simple example of aggregation statistics is now described. A build side table has 5 rows, with key values of CA, CA, NV, NV, NV, and two aggregation columns, with values of (1,8), (1,5), (2,3), (2,10) and (5,8), respectively. For the key value of CA, the minimum, maximum and average of the first aggregation column is 1, the count is 2, and the sum is 2. Those same aggregation statistics for the second column for the key value of CA are 5, 8, 6.5, 2 and 13. The same aggregation statistics for the key value of NV for the first aggregation column are 2, 5, 3, 3, and 9. The same aggregation statistics for the second aggregation column for that NV key value are 3, 10, 7, 3 and 21.

At step 298 a signal is received. The signal may be an end of file marker or it may be a specific request to provide aggregation statistics. The signal may be received by all engines, some engines or one engine. The engine or engines receiving the signal provide all of their aggregation statistics in one embodiment, including the keys, and for each key, the various information about each aggregation column described above. This aggregation statistics, if received from multiple engines, may be combined into a single table of keys and the various values described above, for example using a centralized portion of the silicon containing the various engines, or by a separate processor that provides the requests to the engines.

In another embodiment, the signal is a specific key value and at step 298, that value is hashed and routed to the engine corresponding to the same portion of the hash result that was used to assign the key to the engine is used to assign the signal and the hash to the engine, the engine then receives the signal and the hash, uses the hash to locate the key as described above and provides the aggregation statistics just for that key and no others.

The requested aggregation statistics may then be either provided or used to provide or compute information about the keys, and otherwise identifies it as described above.

Referring again to FIG. 4, data assignment manager 414 identifies the build side as the side for which aggregation columns are specified in the request and otherwise identifies it as described above.

Data storage manager 418 retrieves the key and any join or aggregation column values, and with main storage manager 428, other main storage manager 430 and secondary structure manager 442, provides them as described above, marked as aggregation column data, join column data or both using the information from the request. In one embodiment, the information used is a conventional database query such as a conventional SQL query or other similar request, and each column is identified as an aggregation column if aggregation statistics are needed to fulfill the request or can be used to fulfill the request faster.

As storage manager 580 receives the data, columns marked as aggregation columns and the key and the portion of the hash result are provided by storage manager to aggregation manager 590, along with the location in high speed memory 506 in which to store the statistics described above, and optionally the key. Data from columns not marked as join columns are not stored as described above, but are used to compute the aggregation statistics. Aggregation manager 590 computes the aggregation statistics for each aggregation column as described above and stores the aggregation statistics, and optionally a copy of the key, in high speed memory 506 using the location it receives.

In response to a request to provide a consolidated set of aggregation statistics, request receiver 408 provides the signal to aggregation manager 490 in all of the engines, optionally via aggregation export manager 598 using bus interface 582 as described above. The signal may be instead provided by data assignment manager 414 when data assignment manager 414 reaches the last row in the build side table. Aggregation export manager 598 signals aggregation manager 590 in each engine to provide the aggregation statistics and keys, and internally consolidates such information into a single table containing, for each key value, the key value and for each key value, the aggregation statistics for that key value and aggregation column, and provides it to request receiver 408 via bus interface 582, and request receiver 408 forwards it to the requestor, or internally stores it and uses it to respond to other requests.

If the signal is a request to provide statistics about a single key, request receiver 408 provides the key to data assignment manager 414 which hashes it, uses the portion of the hash result to assign the signal to an engine as described above, and provides the hash result, engine assignment (which may be contained in the hash result) and signal to aggregation export manager 598 via bus interface 582, and aggregation export manager 598 provides it to aggregation manager 590 in the assigned engine. That aggregation manager 590 uses the remainder of the hash result to locate the key in high speed memory 506 as described above, and provides the aggregation statistics (and optionally the key) to aggregation export manager 598, which returns them to request receiver 408 via bus interface 582.

The determination as to whether to request all aggregation statistics or statistics for one or more single key values is based on the minimum requirements to fulfill the request in the fastest possible manner.

Request receiver 408 may perform additional calculations to respond to the request and/or forwards the aggregation statistics and key to the entity from which the request was received. Such entities may include other processes in the processor 304 or another processor in the same or different computer system.

Certain Embodiments

Described is a method of storing data from a row of a first database table for joining with a second database table, including:
  selecting the row from the first database table including a key column;
  hashing the key column from the selected to produce a hash result containing hash bits;
  using a first subset of the hash bits to assign the row to one of two or more hardware processor engines that manages storage of an independently addressable memory bank of two or more independently accessible memory banks; and
  by the one of the two or more hardware processor engines assigned:
    using a second subset of the hash bits to identify one of two or more components of a first data structure stored in the independently addressable memory bank managed by the assigned hardware engine, the two or more components each having a fixed size;
    determining whether the identified one of the two or more components is already being used to store data from an additional row of the first database table, the additional row being different than the row selected;
    responsive to the identified one of the two or more components determined not already being used to store data from the additional row of the first database table:
      storing as much of the key column as will fit in one of two or more components of a first section of a first data structure, at an address corresponding to the second subset of hash bits;

storing a set of one or more join columns from the row selected into some or all of any remaining space in of the one of the two or more components;

determining if there is any portion of the key column or join columns unstored; and responsive to any portion of the key column or join columns unstored, storing the unstored portion of the key column or join columns into a second data structure at a location pointed to by a first pointer stored in the one of the two or more components of the first data structure, the second data structure including the independently addressable memory bank managed by the assigned hardware engine.

The method may additionally include, by the identified engine, responsive to the identified one of the two or more components determined to already be used to store data from the additional row of the first database table:

storing as much of the key column as will fit in one of two or more components of a second section, different from the first section, of the first data structure, at an address corresponding to a second pointer stored or to be stored in the one of the two or more components of the first section;

storing the set of one or more join columns from the row selected into some or all of any remaining space in of the one of the two or more components in the second section;

determining if there is any portion of the key column or join columns unstored; and responsive to any portion of the key column or join columns unstored, storing said unstored portion of the key column or join columns into the second data structure at a location identified by a third pointer stored or to be stored in the one of the two or more components of the second section of the first data structure.

The method may contain additional features whereby:

the second pointer is a pointer to a remainder of a linked list; and the location identified by the second pointer stored or to be stored in the one of the two or more components of the second section of the first data structure is identified by traversing the linked list to locate an end of the linked list.

The method may contain additional features whereby the first subset and the second subset of the hash bits comprise fewer than all of the hash bits of the hash result.

The method may additionally include selecting the first database table from two or more database tables specified in a request, responsive to none of the two or more database tables being stored in the two or more memory banks.

The method may additionally include reserving a block of the memory banks including the one of the two or more components and managed by the one of the two or more processor engines, responsive to a third subset of bits of the hash result, different from the first subset of the hash result.

The method may additionally include storing a third portion of the hash result, different from the first, second portions of the hash result, into either the first section of the first data structure, or the second data structure at the location pointed to by the pointer stored in the one of the two or more components of the first data structure.

Described is a system for storing data from a row of a first database table for joining with a second database table, including:

a data assignment manager having an input for receiving the first database table, the data assignment manager for selecting the row from the first database table including a key column, hashing the key column from the selected to produce a hash result containing hash bits, using a first subset of the hash bits to assign the row to one of two or more hardware processor engines that manages storage of an independently addressable memory bank of two or more independently accessible memory banks, and providing at an output coupled to the one of the two or more hardware processor engines, at least some of the row from the first database table and the hash result;

a main storage manager at the one of the two or more hardware processor engines assigned, the main storage manager having an input coupled to the data assignment manager output the at least some of the row from the first database table and the hash result, the main storage manager for:

using a second subset of the hash bits to identify one of two or more components of a first data structure stored in the independently addressable memory bank managed by the assigned hardware engine, the two or more components each having a fixed size, determining via an input/output whether the identified one of the two or more components is already being used to store data from an additional row of the first database table, the additional row being different than the row selected; and responsive to the identified one of the two or more components determined not already being used to store data from the additional row of the first database table:

storing via an output as much of the key column as will fit in one of two or more components of a first section of a first data structure, at an address corresponding to the second subset of hash bits;

storing via the main storage manager output a set of one or more join columns from the row selected into some or all of any remaining space in of the one of the two or more components; and determining if there is any portion of the key column or join columns unstored, and responsive to any portion of the key column or join columns unstored, providing said unstored portion of the key column or join columns at the main storage manager output; and a secondary structure manager at the one of the two or more hardware processor engines assigned, the secondary structure manager having an input coupled to the main storage manager output for receiving the unstored portion of the key column or join columns, the secondary data structure manager for storing via an output the unstored portion of the key column or join columns into a second data structure at a location pointed to by a pointer stored in the one of the two or more components of the first data structure, the second data structure including the independently addressable memory bank managed by the assigned hardware engine.

The system:

may contain additional features whereby, the main storage manager is additionally for, responsive to the identified one of the two or more components determined to already be used to store data from the additional row of the first database table, providing at the main storage manager output at least some of the row from the first database table and the hash result;

the system may additionally include an other main storage manager having an input coupled to the main storage manager output for receiving the at least some of the row from the first database table and the hash result, the other main storage manager for storing via an output as much of the key column as will fit in one of two or more components of a second section, different from the first section, of the first data structure, at an address corresponding to a second pointer stored or to be stored in the one of the two or more components of the first section, for storing via the other main storage manager output in any remainder of the one of the two or more components of the second section, a set of one or more join columns from the row selected, for determining if there is any portion of the key column or join columns unstored, and responsive to any portion of the key column or join columns unstored, providing at the other main storage manager output a portion of the key column or join columns unstored in the second section of the first data structure; and may contain additional features whereby the secondary structure manager input is additionally coupled to the other main storage manager output for receiving the portion of the key column or join columns unstored in the second section of the first data structure, and the secondary structure manager is additionally for storing via the secondary structure manager output said unstored portion of the key column or join columns into the second data structure at a location identified by a third pointer stored or to be stored in the one of the two or more components of the second section of the first data structure.

The system may contain additional features whereby:

the second pointer is a pointer to a remainder of a linked list; and the location identified by the second pointer stored or to be stored in the one of the two or more components of the second section of the first data structure is identified by traversing the linked list to locate an end of the linked list.

The system may contain additional features whereby the first subset and the second subset of the hash bits comprise fewer than all of the hash bits of the hash result.

The system:

may additionally include a memory manager having an input for receiving a request including an identifier of two or more database tables, the memory manager for selecting the first database table from the two or more database tables specified in the request, responsive to none of the two or more database tables being stored in the two or more memory banks, and providing at an output an identifier of the first database table; and may contain additional features whereby the data assignment manager input is additionally coupled to the memory manager output for receiving the identifier of the first database table, and the data assignment manager receives the first database table responsive to the identifier of the first database table.

The system may contain additional features whereby the data assignment manager is additionally for reserving via an output, a block of the memory bank including the one of the two or more components and managed by the one of the two or more processor engines, responsive to a third subset of bits of the hash result, different from the first subset of the hash result.

The system may contain additional features whereby either the main storage manager or the secondary structure manager is additionally for storing a third portion of the hash result, different from the first, second portions of the hash result, into either the first section of the first data structure, or the second data structure at the location pointed to by the pointer stored in the one of the two or more components of the first data structure.

Described is a computer program product including a nontransitory computer useable medium having computer readable program code embodied therein for storing data from a row of a first database table for joining with a second database table, the computer program product including computer readable program code devices configured to cause a computer system to:

select the row from the first database table including a key column;

hash the key column from the selected to produce a hash result containing hash bits;

use a first subset of the hash bits to assign the row to one of two or more hardware processor engines that manages storage of an independently addressable memory bank of two or more independently accessible memory banks; and by the one of the two or more hardware processor engines assigned:

use a second subset of the hash bits to identify one of two or more components of a first data structure stored in the independently addressable memory bank managed by the assigned hardware engine, the two or more components each having a fixed size;

determine whether the identified one of the two or more components is already being used to store data from an additional row of the first database table, the additional row being different than the row selected;

responsive to the identified one of the two or more components determined not already being used to store data from the additional row of the first database table:

store as much of the key column as will fit in one of two or more components of a first section of a first data structure, at an address corresponding to the second subset of hash bits;

store a set of one or more join columns from the row selected into some or all of any remaining space in of the one of the two or more components;

determine if there is any portion of the key column or join columns unstored; and responsive to any portion of the key column or join columns unstored, store the unstored portion of the key column or join columns into a second data structure at a location pointed to by a first pointer stored in the one of the two or more components of the first data structure, the second data structure including the independently addressable memory bank managed by the assigned hardware engine.

The computer program product may additionally include computer readable program code devices configured to cause the computer system to, by the identified engine, responsive to the identified one of the two or more components determined to already be used to store data from the additional row of the first database table:

store as much of the key column as will fit in one of two or more components of a second section, different from the first section, of the first data structure, at an address corresponding to a second pointer stored or to be stored in the one of the two or more components of the first section;

store the set of one or more join columns from the row selected into some or all of any remaining space in of the one of the two or more components in the second section;

determine if there is any portion of the key column or join columns unstored; and responsive to any portion of the key column or join columns unstored, store said unstored portion of the key column or join columns into the second data structure at a location identified by a third pointer stored or to be stored in the one of the two or more components of the second section of the first data structure.

The computer program product may contain additional features whereby:

the second pointer is a pointer to a remainder of a linked list; and the location identified by the second pointer stored or to be stored in the one of the two or more components of the second section of the first data structure is identified by traversing the linked list to locate an end of the linked list.

The computer program product may contain additional features whereby the first subset and the second subset of the hash bits comprise fewer than all of the hash bits of the hash result.

The computer program product may additionally include computer readable program code devices configured to cause the computer system to select the first database table from two or more database tables specified in a request, responsive to none of the two or more database tables being stored in the two or more memory banks.

The computer program product may additionally include computer readable program code devices configured to cause the computer system to reserve a block of the memory banks including the one of the two or more components and managed by the one of the two or more processor engines, responsive to a third subset of bits of the hash result, different from the first subset of the hash result.

The computer program product may additionally include computer readable program code devices configured to cause the computer system to store a third portion of the hash result, different from the first, second portions of the hash result, into either the first section of the first data structure, or the second data structure at the location pointed to by the pointer stored in the one of the two or more components of the first data structure.

What is claimed is:

1. A method of storing data from a row of a first database table for joining with a second database table, comprising:
   selecting the row from the first database table comprising a key column;
   hashing the key column from the selected row to produce a hash result containing hash bits;
   using a first subset of the hash bits to assign the row to one of a plurality of hardware processor engines that manages storage of an independently addressable memory bank of a plurality of independently accessible memory banks; and
   by the one of the plurality of hardware processor engines assigned:
      using a second subset of the hash bits to identify one of a plurality of components of a first data structure stored in the independently addressable memory bank managed by the assigned hardware engine, the plurality of components each having a fixed size;
      determining whether the identified one of the plurality of components is already being used to store data from an additional row of the first database table, the additional row being different than the row selected;
      responsive to the identified one of the plurality of components determined not already being used to store data from the additional row of the first database table:
         storing as much of the key column as will fit in one of a plurality of components of a first section of the first data structure, at an address corresponding to the second subset of the hash bits;
         storing a set of one or more join columns from the row selected into some or all of any remaining space in of the one of the plurality of components;
         determining if there is any portion of the key column or join columns unstored; and
         responsive to the any portion of the key column or join columns unstored, storing the unstored portion of the key column or join columns into a second data structure at a location pointed to by a first pointer stored in the one of the plurality of components of the first data structure, the second data structure comprising the independently addressable memory bank managed by the assigned hardware engine.

2. The method of claim 1, additionally comprising, by the assigned hardware processor engine, responsive to the identified one of the plurality of components determined to already be used to store data from the additional row of the first database table:
   storing as much of the key column as will fit in one of a plurality of components of a second section, different from the first section, of the first data structure, at an address corresponding to a second pointer stored or to be stored in the one of the plurality of components of the first section;
   storing the set of one or more join columns from the row selected into some or all of any remaining space in of the one of the plurality of components of the second section;
   determining if there is any portion of the key column or join columns unstored; and
   responsive to any portion of the key column or join columns unstored, storing said unstored portion of the key column or join columns into the second data structure at a location identified by a third pointer stored or to be stored in the one of the plurality of components of the second section of the first data structure.

3. The method of claim 2, wherein:
   the second pointer is a pointer to a remainder of a linked list; and
   the address identified by the second pointer stored or to be stored in the one of the plurality of components of the second section of the first data structure is identified by traversing the linked list to locate an end of the linked list.

4. The method of claim 1, wherein the first subset and the second subset of the hash bits comprise fewer than all of the hash bits of the hash result.

5. The method of claim 1, additionally comprising selecting the first database table from a plurality of database tables specified in a request, responsive to none of the plurality of database tables being stored in the plurality of memory banks.

6. The method of claim 1,
   additionally comprising reserving a block of the memory banks managed by the one of the plurality of processor engines, responsive to a third subset of bits of the hash result, different from the first subset of the hash bits.

7. The method of claim 1, additionally comprising storing a third subset of the hash bits, different from the first and second subset of the hash bits, into either the first section of the first data structure, or the second data structure at the location pointed to by the first pointer stored in the one of the plurality of components of the first data structure.

8. A system for storing data from a row of a first database table for joining with a second database table, comprising:
   a data assignment manager having an input for receiving the first database table, the data assignment manager for selecting the row from the first database table comprising a key column, hashing the key column from the selected row to produce a hash result containing hash bits, using a first subset of the hash bits to assign the row to one of a plurality of hardware processor engines that manages storage of an independently addressable memory bank of a plurality of independently accessible memory banks, and providing at an output coupled to the one of the plurality of hardware processor engines, at least some of the row from the first database table and the hash result;

a main storage manager at the one of the plurality of hardware processor engines assigned, the main storage manager having an input coupled to the data assignment manager output the at least some of the row from the first database table and the hash result, the main storage manager for:

using a second subset of the hash bits to identify one of a plurality of components of a first data structure stored in the independently addressable memory bank managed by the assigned hardware engine, the plurality of components each having a fixed size, and determining via an input/output whether the identified one of the plurality of components is already being used to store data from an additional row of the first database table, the additional row being different than the row selected; and responsive to the identified one of the plurality of components determined not already being used to store the data from the additional row of the first database table:

storing via an output as much of the key column as will fit in one of a plurality of components of a first section of the first data structure, at an address corresponding to the second subset of the hash bits;

storing via the main storage manager output a set of one or more join columns from the row selected into some or all of any remaining space in the one of the plurality of components; and determining if there is any portion of the key column or join columns unstored, and responsive to the any portion of the key column or join columns unstored, providing said unstored portion of the key column or join columns at the main storage manager output; and a secondary structure manager at the one of the plurality of hardware processor engines assigned, the secondary structure manager having an input coupled to the main storage manager output for receiving the unstored portion of the key column or join columns, the secondary data structure manager for storing via an output the unstored portion of the key column or join columns into a second data structure at a location pointed to by a pointer stored in the one of the plurality of components of the first data structure, the second data structure comprising the independently addressable memory bank managed by the assigned hardware engine.

9. The system of claim 8:
wherein, the main storage manager is additionally for, responsive to the identified one of the plurality of components determined to already be used to store the data from the additional row of the first database table, providing at the main storage manager output at least some of the row from the first database table and the hash result;
the system additionally comprising an other main storage manager having an input coupled to the main storage manager output for receiving the at least some of the row from the first database table and the hash result, the other main storage manager for storing via an output as much of the key column as will fit in one of a plurality of components of a second section, different from the first section, of the first data structure, at an address corresponding to a second pointer stored or to be stored in the one of the plurality of components of the first section, for storing via the other main storage manager output in any remainder of the one of the plurality of components of the second section, a set of one or more join columns from the row selected, for determining if there is any portion of the key column or join columns unstored, and responsive to any portion of the key column or join columns unstored, providing at the other main storage manager output a portion of the key column or join columns unstored in the second section of the first data structure; and wherein the secondary structure manager input is additionally coupled to the other main storage manager output for receiving the portion of the key column or join columns unstored in the second section of the first data structure, and the secondary structure manager is additionally for storing via the secondary structure manager output said unstored portion of the key column or join columns into the second data structure at a location identified by a third pointer stored or to be stored in the one of the plurality of components of the second section of the first data structure.

10. The system of claim 9, wherein:
the second pointer is a pointer to a remainder of a linked list; and
the address identified by the second pointer stored or to be stored in the one of the plurality of components of the second section of the first data structure is identified by traversing the linked list to locate an end of the linked list.

11. The system of claim 8, wherein the first subset and the second subset of the hash bits comprise fewer than all of the hash bits of the hash result.

12. The system of claim 8:
additionally comprising a memory manager having an input for receiving a request comprising an identifier of a plurality of database tables, the memory manager for selecting the first database table from the plurality of database tables specified in the request, responsive to none of the plurality of database tables being stored in the plurality of memory banks, and providing at an output an identifier of the first database table; and
wherein the data assignment manager input is additionally coupled to the memory manager output for receiving the identifier of the first database table, and the data assignment manager receives the first database table responsive to the identifier of the first database table.

13. The system of claim 8, wherein the data assignment manager is additionally for reserving via the data assignment manager output, a block of the memory bank managed by the one of the plurality of processor engines, responsive to a third subset of bits of the hash result, different from the first subset of the hash bits.

14. The system of claim 8, wherein either the main storage manager or the secondary structure manager is additionally for storing a third subset of the hash bits, different from the first and second portions of the hash bits, into either the first section of the first data structure, or the second data structure at the location pointed to by the first pointer stored in the one of the plurality of components of the first data structure.

15. A computer program product comprising a nontransitory computer useable medium having computer readable program code embodied therein for storing data from a row of a first database table for joining with a second database table, the computer program product comprising computer readable program code devices configured to cause a computer system to:
- select the row from the first database table comprising a key column;
- hash the key column from the selected row to produce a hash result containing hash bits;
- use a first subset of the hash bits to assign the row to one of a plurality of hardware processor engines that manages storage of an independently addressable memory bank of a plurality of independently accessible memory banks; and
- by the one of the plurality of hardware processor engines assigned:
  - use a second subset of the hash bits to identify one of a plurality of components of a first data structure stored in the independently addressable memory bank managed by the assigned hardware engine, the plurality of components each having a fixed size;
  - determine whether the identified one of the plurality of components is already being used to store data from an additional row of the first database table, the additional row being different than the row selected;
  - responsive to the identified one of the plurality of components determined not already being used to store data from the additional row of the first database table:
    - store as much of the key column as will fit in one of a plurality of components of a first section of the first data structure, at an address corresponding to the second subset of the hash bits;
    - store a set of one or more join columns from the row selected into some or all of any remaining space in of the one of the plurality of components;
    - determine if there is any portion of the key column or join columns unstored; and
    - responsive to the any portion of the key column or join columns unstored, store the unstored portion of the key column or join columns into a second data structure at a location pointed to by a first pointer stored in the one of the plurality of components of the first data structure, the second data structure comprising the independently addressable memory bank managed by the assigned hardware engine.

16. The computer program product of claim 1, additionally comprising computer readable program code devices configured to cause the computer system to, by the identified engine, responsive to the identified one of the plurality of components determined to already be used to store data from the additional row of the first database table:
- store as much of the key column as will fit in one of a plurality of components of a second section, different from the first section, of the first data structure, at an address corresponding to a second pointer stored or to be stored in the one of the plurality of components of the first section;
- store the set of one or more join columns from the row selected into some or all of any remaining space in of the one of the plurality of components of the second section;
  - determine if there is any portion of the key column or join columns unstored; and
  - responsive to any portion of the key column or join columns unstored, store said unstored portion of the key column or join columns into the second data structure at a location identified by a third pointer stored or to be stored in the one of the plurality of components of the second section of the first data structure.

17. The computer program product of claim 2, wherein:
the second pointer is a pointer to a remainder of a linked list; and
the address identified by the second pointer stored or to be stored in the one of the plurality of components of the second section of the first data structure is identified by traversing the linked list to locate an end of the linked list.

18. The computer program product of claim 15, wherein the first subset and the second subset of the hash bits comprise fewer than all of the hash bits of the hash result.

19. The computer program product of claim 15, additionally comprising computer readable program code devices configured to cause the computer system to select the first database table from a plurality of database tables specified in a request, responsive to none of the plurality of database tables being stored in the plurality of memory banks.

20. The computer program product of claim 15, additionally comprising computer readable program code devices configured to cause the computer system to reserve a block of the memory banks managed by the one of the plurality of processor engines, responsive to a third subset of bits of the hash result, different from the first subset of the hash bits.

21. The computer program product of claim 15, additionally comprising computer readable program code devices configured to cause the computer system to store a third subset of the hash result, different from the first and second of the hash bits, into either the first section of the first data structure, or the second data structure at the location pointed to by the first pointer stored in the one of the plurality of components of the first data structure.

* * * * *